United States Patent Office 3,356,315
Patented Dec. 5, 1967

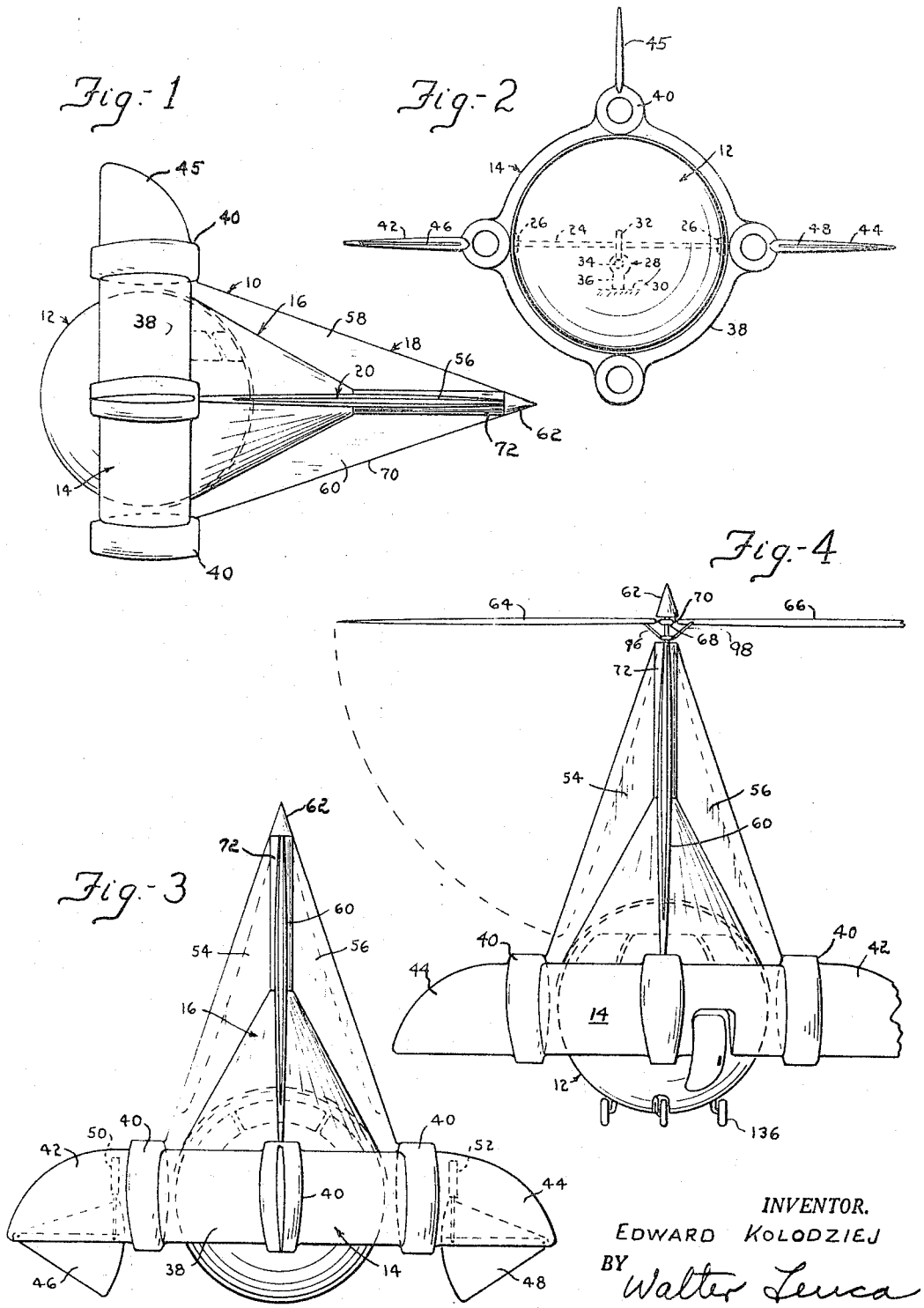

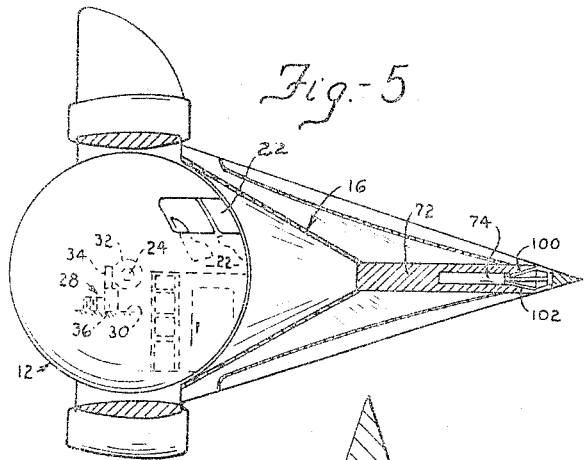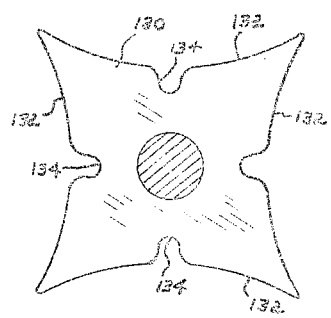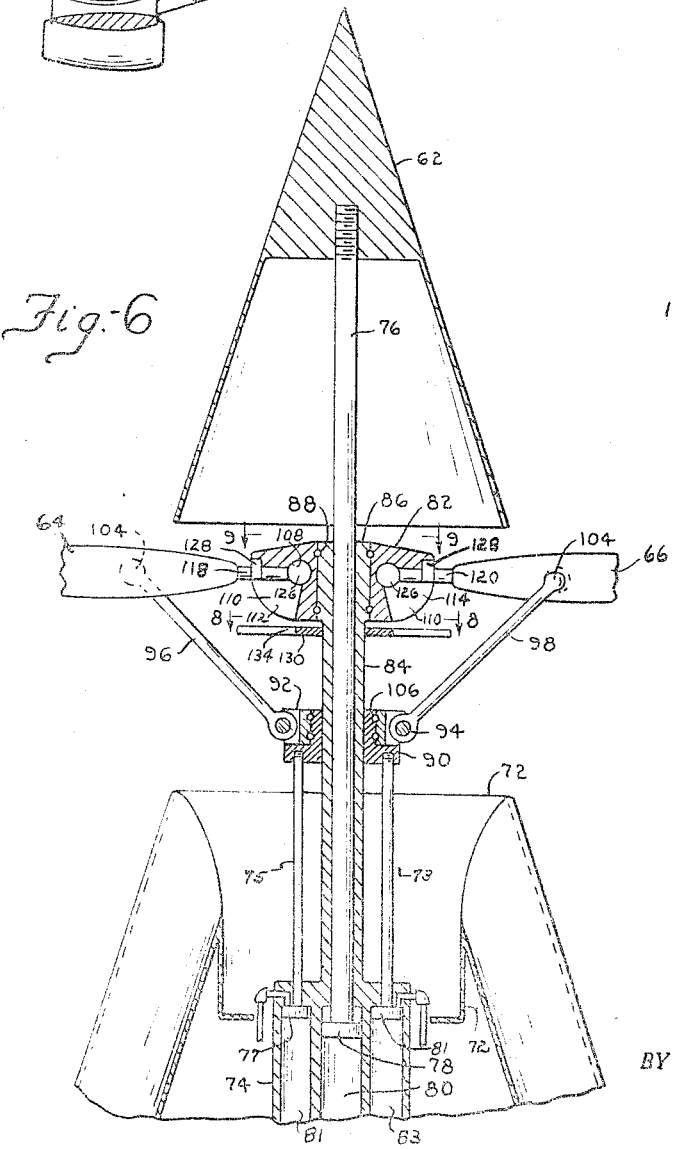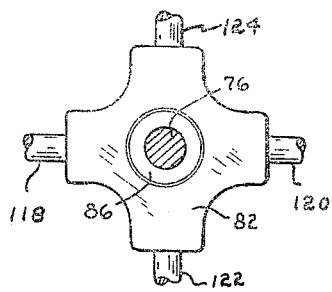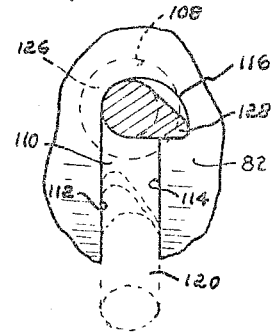
INVENTOR.
EDWARD KOLODZIEJ
ATTORNEY

3,356,315
AIRCRAFT
Edward Kolodziej, 5616 W. 5th Ave., Gary, Ind. 46406
Filed Oct. 23, 1965, Ser. No. 503,468
5 Claims. (Cl. 244—7)

ABSTRACT OF THE DISCLOSURE

An aircraft for vertical take off and landing, and for horizontal flight when airborne, comprising a spherical fuselage; an annularly shaped airfoil encircling said fuselage and being connected to said fuselage by a diametral shaft for pivotal rotation over said fuselage; propulsion engines mounted on said annular airfoil; a coniform nose extending from the leading edge of said annular airfoil forward of said leading edge and tapering to an apex; an elongated shaft means extending forwardly of said apex end of said coniform nose; a plurality of planular airfoils spaced around said cone and elongated shaft means radially extending therefrom; and means interior of the fuselage for controlling the rotation of said annular airfoil thereby determining the line of flight.

---

This invention relates to new and useful improvements in aircrafts and more particularly to a novel construction, form and arrangement of component parts of the aircraft for the purpose of improving load capacity and maneuverability on takeoff, in flight and on landing.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

FIGURE 1 is a side elevation of the aircraft of my invention as it would appear in horizontal flight;

FIGURE 2 is a rear elevation of the aircraft of my invention;

FIGURE 3 is a plan elevation thereof;

FIGURE 4 is a front elevation of the aircraft of my invention showing the rotor blades (one of which is shown broken) in rotating poistion and the landing gear extended preparatory to landing;

FIGURE 5 is a side elevation of the aircraft of my invention shown transversely sectioned excepting the fuselage;

FIGURE 6 is an enlarged detail view of the rotor blade expanding and folding mechanism shown partly in fragment;

FIGURE 7 is a fragmentary detail view of the variable pitch mechanism of a rotor blade;

FIGURE 8 is a plan elevation of the rotor blade guide means taken along line 8—8 of FIGURE 6; and FIGURE 9 is a plan elevation of the rotor blade hub device taken along line 9—9 of FIGURE 6.

With reference to the drawings, numeral 10 designates generally the novel aircraft of my invention. It comprises generally, as numerically illustrated in FIGURE 1, a spherically shaped fuselage 12, a fuselage encircling, annularly shaped engine mount 14, a coniform nose portion 16, a plurality of planular shaped, rotor blade housing 18 normally extending from said nose, and rotor blades 20.

With reference to FIGURES 1 and 3, generally, and FIGURES 2, 4 and 5, specifically, the fuselage 12 is spherical in shape and is conventionally provided with a control cabin 22 (FIGURE 5) and windshield area therefor, in the forward area thereof. As diagrammatically illustrated in FIGURES 2 and 5, fuselage 12 is provided with a horizontal, diametrally positioned shaft 24 which extends through diametrally opposite sides of fuselage 12, supported in bearing mounts 26, and the opposite distal ends thereof integrally connect annular engine mount 14 at its diametrally opposite sides. Shaft rotating drive 28 is mounted on a surface 30 which is fixed relative to fuselage 12. Shaft-rotating drive 28 comprises generally any suitable drive means known to those skilled in the art such as shaft gear 32 in meshing engagement with worm 34 which is driven by motor 36. The details of the arrangement and location of drive platform 30, cabin 22 as well as other drives, control lines, fuel tanks and other equipment are, of course, dependent upon the size of the fuselage and the purpose of the aircraft of my invention and do not form a part thereof.

Encircling spherical fuselage 12 and closely spaced thereto is annular motor mount 14. Motor mount 14, whether formed from monolithic material or reticulately constructed, is provided with an airfoil exterior 38. A plurality of jet-propulsion engines 40 are mounted therein and are located symmetrically therearound. I prefer to construct the aircraft of my invention with at least four jet-propulsion engines, two of which comprise the port and starboard engines so that by controlling the respective powers thereof effect right and left turns; and the other two comprise the top and bottom engines so that by controlling their respective powers, effect to assist shaft drive 28 to rotate annular motor mount 14 relative to fuselage 12. Wing airfoils 42 and 44 are provided to laterally extend from motor mount 14. A vertical stabilizing airfoil 45 is also provided on motor mount 14. As stated above, the distal ends of diametral shaft 24 in fuselage 12 are connected to motor mount 14 to rotate motor mount 14 about spherical fuselage 12. As illustrated in FIGURE 3, airfoil wing members 42 and 44 are expandable to increase the airfoil surface thereof by providing an interiorly housed wing sector 46 and 48, respectively, which are constructed and linked to their respective wing members 42 and 44 to retract therein and extend therefrom by means of motive devices such as hydraulic motor means 50 and 52, respectively. The control lines therefor, as well as other lines including fuel lines, communicate with supply or control devices in the fuselage by way of the openings provided in fuselage 12 for shaft 24.

Forwardly extending from the leading edge therearound of the motor mount 14 is conicular nose 16 which I illustrate as preferably formed from transparent material in order to provide means for visibility since the forward projecting surface of fuselage 12 is completely covered by cone 16 during normal operation of the aircraft. Axially extending from conicular nose portion 16 is an elongated shaft means 72 which is formed hollow to provide a housing for motor drive means 74. Elongated shaft means or housing 72 forwardly terminates with a pointed prow 62. Normally or radially extending from the exterior surface of conicular nose portion 16 and elongated housing 72 and arranged equilaterally therearound, are a plurality of planular airfoils, designated generally by numeral 18, longitudinally extending from the leading edge of annular engine mount 14 to prow 62. I show planular airfoils 18 as particularly comprising four equilaterally spaced planular airfoils 54, 56, 58 and 60, each of which are provided with a longitudinal recess in the edge thereof and substantially the length thereof to receive and house therein one of rotor blades 64, 66, 68 and 70 when in retracted position. I illustrate motor drive means 74 as a plural chamber hydraulic motor which functions to lift rotor blades 64, 66, 68 and 70 to their extended position for rotation and to retract said rotor blades into the recesses in the edges of the planular airfoils 54, 56, 58 and 60. I accomplish the foregoing, as shown in FIGURES 6-9, by providing a hollow shaft 84 fixedly mounted in elongated housing 72 and axially extending therefrom. The end 86 of shaft 84 is formed to provide a supporting axle for hub device 82. Hub device 82 is rotatably movable on shaft end 86 and longitudinally fixed thereon by bearing-race means 88. Mounted on shaft 84, spaced from hub 82, and longitudinally movable thereon is rotor blade bearing block 90. Rotatably movable on bearing block 90 is collar means 92. Collar means 92 is connected to block 90 and fixed thereon against longitudinal movement by means of bearing-race means 106. Rotatably movable with collar means 92 on block 90, are link rods 96, 98, 100 and 102 (FIGURES 6 and 5) which pivotally connect collar means 92 at their one ends by pin means 94. The other ends of link rods 96, 98, 100 and 102 connect the trailing edges of rotor blades 64, 66, 68 and 70, respectively, by means of ball and socket joint 104. Hub device 82 is formed with a plurality of equiangular spaced socket cavities 108. Socket cavities are equal in number to the number of rotor blades 20, which in the drawing are shown as four in number. Each of the four socket cavities 108 communicate with the exterior of hub 82 by means of a slotted well 110 which is formed with spaced parallel walls 112 and 114 generally sector shaped to provide pivotal passage therein with the socket cavity 108 as the point of fulcrum. Each of slotted wells 110 of hub 82 is provided with a curvilinear enlargement 116 at the upper sector side of the slotted well 110 for purposes hereinafter described. Rotor blades 64, 66, 68 and 70 are provided with shaft ends 118, 120, 122 and 124 having ball-formed terminals 126 which are contained in the sockets 108 of hub device 82 and comprise the ball and socket joint by which means the rotor blades are connected to the hub device. Shaft ends 118, 120, 122 and 124 are pivotally movable in their respective sector shaped slotted well 110, the upper and lower limits thereof being aligned with rotor blades in extended, rotating position and the retracted position, respectively. Each of rotor blade shaft ends 118, 120, 122 and 124 is provided with a cam projection 128 which operates with hub 82 to regulate the angular pitch of the rotor blades. FIGURE 7 is a fragmented view of hub 82 showing in detail the camming mechanism for controlling the pitch of rotor blade 66. What is represented is shaft end 120 of blade 66, in fragment. Shaft end 120, shown in phantom lines illustrates the rotor blade in retracted position, the trailing edge thereof facing into the recess of planular airfoil 56. As rotor blade 66 is moved upward toward its radially extended, rotating position, cam projection 128, being constrained within the confines of walls 112 and 114 of slotted well 110, serves to hold rotor blade 66 edgewise relative to planular airfoil 56. Upon lifting blade 66 to its upper limits, cam projection 128 on shaft end 122 enters the curvilinear enlargement 116 of well 110 and will be cammingly guided thereby to rotate blade 66 from a vertical pitch to a substantially horizontal pitch. By controlling the lift on rotor blade 66 at its upper limit, the rotation of the blade may be arrested at any desired pitch between the pitch limits. The lifting operation of rotor blades 64, 66, 68 and 70 from their retracted position in planular airfoils 54, 56, 58 and 60, respectively, to their radially extending, rotating position, including the rotation thereof to the desired pitch, is accomplished by moving bearing block 90 longitudinally on shaft 84. The motive means for bearing block 90 is motor drive means 74 which comprises, according to the embodiment illustrated, a plural chamber hydraulic cylinder. Hydraulic cylinder, which I will also designated by the numeral 74, includes cylinder chambers 80, 81 and 83 in which are longitudinally movable, by means of fluid pressure, pistons 78, 77 and 81 and their connecting rods 76, 75 and 73, respectively. Prow 62 is separable from the forward end of elongated housing 72 and axially moved therefrom by being supportingly connected on the end of piston rod 76. Actuation of piston 78 in cylinder chamber 80 serves to close and open prow 62 against and from the forward end of elongated housing 72 in order to protectively contain rotor blade hub device 82 when in forward flight and to uncover the rotor blade hub device 82 to allow rotation thereof, respectively. Connecting rods 75 and 73 connect to bearing block 90 and is longitudinally movable on shaft 84 by actuation of pistons 77 and 81 which operate in unison.

Spaced below hub device 82 on shaft 84 is guide plate 130. Guide plate 130 as shown in FIGURE 9, comprises a quadrilaterally sided member. Each of the quadrilateral sides 132 has a central notch 134 to which the side 132 from both corner ends converge. Guide plate 130 is fixed on shaft 84 so that one of notches 134 in quadrilateral sides 132 are vertically aligned with a rotor blade recess in planular airfoils 54, 56, 60 and 62, and thereby serves as a guide to direct the rotor blades into the recesses of the planular airfoils during retraction thereof.

The operation of my invention is as follows: For take-off the aircraft is in a position shown in FIGURE 4 with the exception that the rotor blades are folded to its retracted position in planular airfoils 54, 56, 58 and 60, and prow 62 is closed onto elongated housing 72. As noted, annular engine mount 14 is rotated relative to fuselage 12 to a horizontal position so that engines 40 are vertically positioned so as to deliver their thrusts in a vertical direction. Upon being airborne, landing gear 136 is retracted to openings in the body provided therefor by means conventional and well known to those skilled in the art to which this invention pertains. At a desired flight altitude, shaft rotating drive 28 is operated to rotate worm shaft 34 and gear 32 on shaft 24 thereby rotating annular engine mount 14 relative to fuselage 12. Simultaneously therewith, the power of bottom engine 40 is reduced to provide propulsive assistance to the rotation of engine mount 14 around fuselage 12. Upon positioning engine mount 14 to the flight direction desired, such as horizontal flight as shown in FIGURE 1, the rotating operation of engine mount 14 by means of drive 28 and engine power differential is terminated. Depending upon the need for air lift on wings 42 and 44, the airfoil surface thereof is expanded by extending wing sectors 46 and 48, respectively. This is accomplished by means of hydraulic motors 50 and 52 which are controlled by the pilot of the craft. Left and right turn maneuvers are accomplished by suitably varying the propulsive power to the port and starboard engines so that more thrust is provided at the engine on the outboard side of the turn. In landing the craft of my invention, annular engine mount 14 is rotated relative to fuselage 12 to assume a horizontal position with the engines 40 vertically directed to deliver a vertical thrust and with the appropriate reduction of power the aircraft is made to descend vertically under the influence of gravity at a speed controlled by the counter-thrust of engines 40. During the descending operation, rotor blades 64, 66, 68 and 70 are extended from their retracted or folded position in planular airfoils 54, 56, 58 and 60, respectively. This is accomplished by operating hydraulic motor 74. In the operation of hydraulic motor 74, piston 78 is first actuated to lift prow 62 to uncover the rotating mechanism of the rotor blades to permit free rotation thereof. To extend the rotor blades to their horizontally rotating position, cylinder chambers 81 and 83 are simultaneously operated to move pistons 77 and 81, respectively, and their connecting rods 75 and 73 upwardly thereby lifting bearing block 90 on shaft 84 and connecting links 96, 98, 100 and 102 to extend rotor blades 64, 66, 68 and 70. As soon as rotor blade shaft ends 118, 120, 122 and 124 are free from guide plate 130 whereby they are revolvingly constrained, the rotor blades will be free to revolve with hub device 82 on bearing end 86 of shaft 84. With reference to FIGURE 7, as described hereinbefore, cam projection 128 of each shaft end 118, 120, 122 and 124 will be constrained to follow the path provided by cam surface 116 to rotate the blades to provide an airfoil pitch thereto. The rotation of rotor blades 64, 66, 68 and 70 with an airfoil pitch will provide a lifting force which serves to stabilize the aircraft in its descent. In addition, in the event of engine failure the rotating blades will serve to provide a safe airborne descent. Landing gear 136 is lowered prior to touching ground and upon stopping of the rotor blades, cylinder motor 74 is operated to lower bearing block 90. This operation will cause rotor blade connecting links 96, 98, 100 and 102 to fold rotor blades 64, 66, 68 and 70 into the recesses as provided therefor in planular airfoils 54, 56, 58 and 60, respectively. In so doing, camming projection 128 on each rotor blade shaft end 118, 120, 122 and 124 will reverse its rotating motion along cam surface 116 of hub 82 and together with the pulling force applied at the trailing edge of each blade by link means 96, 98, 100 and 102 the rotor blades will be positioned to enter the recess of the planular airfoils edgewise. In order to insure that the rotor blades will be aligningly positioned to enter the recess of the planular airfoils, guide plate 130 is provided as described above.

Cylinder chamber 80 is operated to lower piston 78 and its connecting rod 76 together with prow 62 connected thereto onto elongated housing 72 to cover the rotor blade rotating mechanism.

While particular embodiments of the present invention have been herein illustrated and described, it is not intended to limit the invention to such disclosure, but changes and modifications may be made therein and thereto within the scope of the following claims.

What I claim is:

1. An aircraft comprising:
   a spherical fuselage;
   an airfoiled, annular engine mount adjacently encircling said fuselage;
   a plurality of propulsion engines being carried by said engine mount;
   shaft means connecting said engine mount and said fuselage, said shaft means being rotatably supported in said spherical fuselage on a horizontal diametral axis thereof;
   drive means in said fuselage connecting said shaft means to rotate said annular engine mount around said spherical fuselage on said diametral axis;
   a coniform nose extending from the leading edge of said annular engine mount and tapering to an apex end forward of the leading edge of said annular engine mount and said spherical fuselage;
   the apex end of said nose comprising an elongated shaft means; and
   a plurality of planular airfoils spaced around said cone and elongated shaft means, and radially extending outwardly therefrom.

2. An aircraft comprising:
   a spherical fuselage;
   an annular engine mount encircling said fuselage and being closely spaced therefrom;
   a plurality of propulsion engines connecting said engine mount, said engines being spaced symmetrically around said engine mount;
   shaft means connecting said engine mount and said fuselage, said shaft means being rotatably supported in said spherical fuselage on a horizontal diametral axis thereof;
   drive means in said fuselage connecting said shaft means to rotate said annular engine mount around said spherical fuselage on said diametral axis;
   wings extending laterally from said engine mount;
   a coniform nose forwardly extending from the leading edge of said annular engine mount and tapering to an apex end forward of the leading edge of said annular engine mount and said spherical fuselage;
   the apex end of said nose comprising an elongated shaft means; and
   a plurality of planular airfoils spaced around said cone and elongated shaft means, and normally extending outwardly therefrom.

3. An aircraft comprising:
   a spherical fuselage;
   an airfoiled engine mount adjacently encircling said fuselage for carrying a plurality of propulsion engines spaced therearound;
   shaft means connecting said engine mount and said fuselage, said shaft means being axially aligned with the horizontal diameter of said spherical fuselage;
   drive means in said fuselage connecting said shaft means for rotating said engine mount around said spherical fuselage;
   wings extending horizontally from said engine mount;
   a coniform nose connecting the leading edge of said annular engine mount therearound at the base end of said cone, said nose covering a portion of said spherical fuselage extending forward of the leading edge of said annular engine mount;
   an elongated housing means connecting the apex end of said cone and forwardly extending therefrom;
   shaft means connecting said housing means and longitudinally extending therefrom;
   hub means rotatably mounted on said shaft means, said hub means being provided with,
      a plurality of socket cavities,
      slotted wells communicating said socket cavities with the periphery of said hub, and
      the upper end of said slotted wells at the periphery of said hub being eccentrically enlarged to provide a cam guide surface;
   a bearing block means mounted on said shaft means spaced from said hub means for longitudinal movement thereon;
   collar means rotatably mounted on said bearing block means and longitudinally movable therewith;
   reciprocating drive means in said elongated housing means;
   means connecting said reciprocating drive means and said bearing block for slidably moving said bearing block longitudinally on said shaft means;
   a plurality of rotor blades, one end of each of said rotor blades having,
      shaft means and a terminal ball means,
      said terminal ball means engaging said hub means in said socket cavities for swivel motion therein,
      said shaft means of each rotor blade end being pivotally movable in said slotted well,
      a cam projection on said shaft means of said rotor blades,
      said cam projection of said shaft means being slidingly movable in said eccentric enlargement of said slotted well for rotating said rotor blades;
   link means pivotally connecting said collar means and the edge of said rotor blades;
   a plurality of planular airfoils equilaterally spaced around said cone and said elongated housing; and
   the outwardly facing edges of said planular airfoils being recessed along the length thereof for receiving said rotor blades.

4. An aircraft comprising:
   a spherical fuselage;
   an airfoiled engine mount adjacently encircling said fuselage for carrying a plurality of propulsion engines spaced therearound;
   shaft means connecting said engine mount and said fuselage, said shaft means being axially aligned with the horizontal diameter of said spherical fuselage;
   drive means in said fuselage connecting said shaft means for rotating said engine mount around said spherical fuselage;
   a conicular nose connecting the leading edge of said annular engine mount therearound at the base end of said cone, said nose covering a portion of said spherical fuselage extending forward of the leading edge of said annular engine mount;
   an elongated housing means connecting the apex end of said cone and forwardly extending therefrom;

shaft means connecting said housing means and longitudinally extending therefrom;

a plurality of rotor blades rotatably mounted on said shaft means, said rotor blades being pivotally extendable for rotation;

a plurality of planular airfoils equilaterally spaced around said cone and said elongated housing and extending normally therefrom; and the outwardly facing edges of said planular airfoils being recessed along the length thereof for receiving said rotor blades when said rotor blades are retracted.

5. In an aircraft wherein a plurality of rotor blades rotatably connect an upstanding shaft and said rotor blades are employed for descent of said aircraft, means connecting said rotor blades to said upstanding shaft comprising:

hub means rotatably mounted on said shaft means, said hub means being provided with,
a plurality of socket cavities,
slotted wells communicating said socket cavities with the periphery of said hub, and
the upper end of said slotted wells at the periphery of said hub being eccentrically enlarged to provide a cam guide surface;

a bearing block means mounted on said shaft means spaced from said hub means for longitudinal movement thereon;

collar means rotatably mounted on said bearing block means and longitudinally movable therewith;

reciprocating drive means connecting said bearing block means for slidably moving said bearing block means longitudinally on said shaft means;

one end of each of said rotor blades having,
shaft means and a terminal ball means,
said terminal ball means engaging said hub means in said socket cavities for swivel motion therein,
said shaft means of each rotor blade end being pivotally movable in said slotted well,
a cam projection on said shaft means of said rotor blades,
said cam projection of said shaft means being slidingly movable in said eccentric enlargement of said slotted well for rotating said rotor blades; and link means pivotally connecting said collar means and the edge of said rotor blades.

References Cited

UNITED STATES PATENTS

| | | | |
|---|---|---|---|
| 2,868,476 | 1/1959 | Schlieben | 244—7.3 |
| 2,952,422 | 9/1960 | Fletcher et al. | 244—12 |
| 3,005,603 | 10/1961 | Gaskins | 244—6 |

FOREIGN PATENTS

| | | |
|---|---|---|
| 9,685 | 8/1911 | Great Britain. |

FERGUS S. MIDDLETON, *Primary Examiner.*

T. W. BUCKMAN, *Assistant Examiner.*